July 16, 1929.  H. S. MORRISON  1,720,800
TOASTING MACHINE
Filed Nov. 10, 1926    2 Sheets-Sheet 1
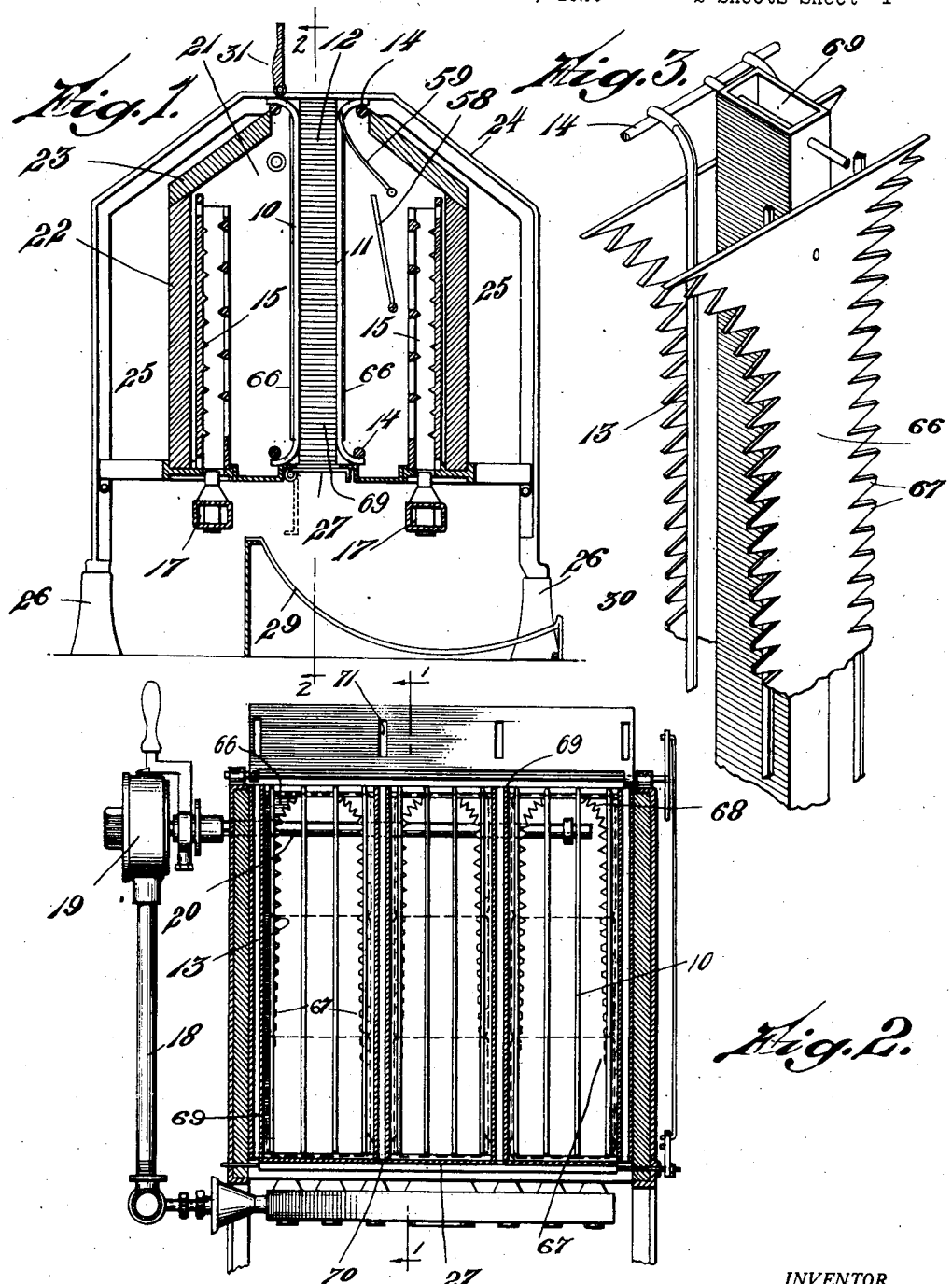
INVENTOR.
Harry S. Morrison.
BY Barlow & Barlow
ATTORNEYS.

July 16, 1929.                H. S. MORRISON                  1,720,800
                              TOASTING MACHINE
                            Filed Nov. 10, 1926          2 Sheets-Sheet 2
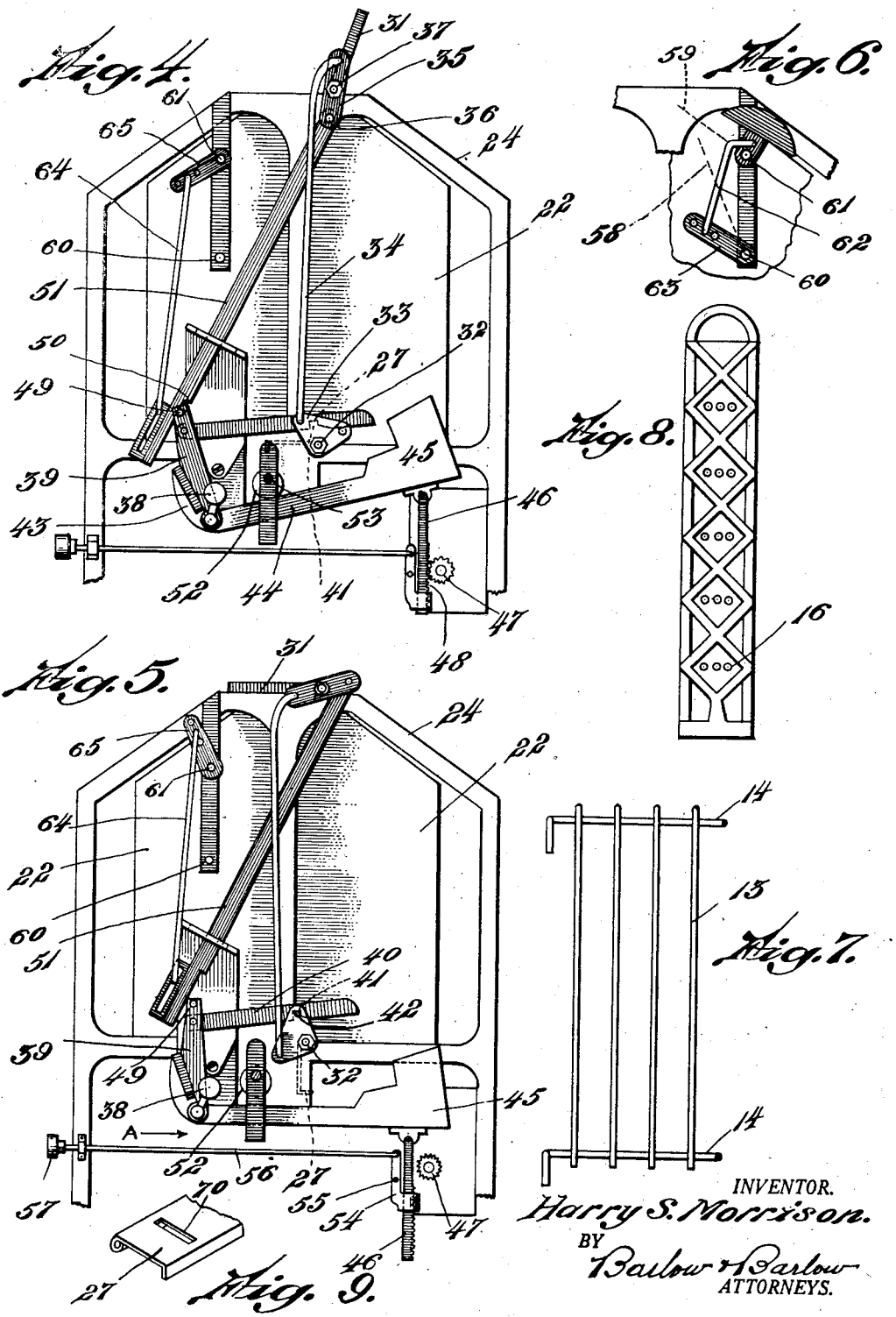
INVENTOR.
Harry S. Morrison.
BY
Barlow & Barlow
ATTORNEYS.

Patented July 16, 1929.

1,720,800

UNITED STATES PATENT OFFICE.

HARRY S. MORRISON, OF CRANSTON, RHODE ISLAND.

TOASTING MACHINE.

Application filed November 10, 1926. Serial No. 147,533.

This invention relates to an apparatus adapted primarily for toasting bread but which may be employed for treatment of foods in which it is desired to subject the food directly to a toasting action or heat on both sides simultaneously; and an object of this invention is to provide a means for automatically permitting the discharge of the bread or food from the machine after exposing the same to its toasting action for a predetermined length of time.

A further object of the invention is to provide a construction in which the heat is advantageously controlled to maintain any predetermined degree of temperature within and to prevent heating of the outside casing of the machine.

A still further object of the invention is to provide means for protecting the drier edges of a slice of bread from being acted upon to a greater extent than the more moist portions of the bread.

With these and other objects in view, the invention consists of certain novel features of construction, as will be more fully described, and particularly pointed out in the appended claims.

In the accompanying drawings:

Figure 1 is a sectional end view of the apparatus.

Figure 2 is a sectional side view of the same.

Figure 3 is a perspective view showing means provided for protecting the edges of the bread from excess heat.

Figures 4 and 5 are end elevations of the machine showing the operating mechanism in two different positions for loading and permitting a discharge of the bread from the machine.

Figure 6 is a fragmental detail of a portion of the operating mechanism operatively associated with the mechanism shown in Figures 4 and 5 for permitting the bread to discharge.

Figure 7 is a fragmental detail of a portion of one of the guides between which the bread is supported.

Figure 8 is a face view of one of the radiant burners employed in the heating elements in the machine.

Figure 9 is a perspective view of a fragment of the bottom or support for the slices of bread.

It is found in the practical operation of bread toasters of the character shown herein, of advantage to provide means for positively timing the length that the bread is exposed to a toasting action to accurately secure the degree of toasting desired and it is also found of advantage to provide means for protecting the dry edges of the slice of bread so that the same will not become burnt during the period that the middle portion of the slice of bread which is more moist is obtaining the desired degree of brownness or toasting of which the following is a detailed description of one means by which such desired results may be accomplished:—

With reference to the drawings, 10 and 11 designate two sets of guiding bars or gratings set on opposite sides of the center of the machine and spaced apart as at 12 a sufficient distance to permit a slice of bread or the like to be passed downward between them. These sets of bars or gratings are arranged vertically and are formed of wires 13, each of which has one dimension greater than the other to stiffen the same against bending in one direction, that is, the dimension of the wire in the direction towards the opposite grating is greater than their dimension at right angles thereto, whereby any bending effect of heat upon these gratings will cause the bars 13 thereof, to bend toward the next adjacent bar of its set. In other words, the warping of the bars of the two gratings will occur in parallel planes so that the distance 12 between the gratings will not be changed by any effect of heat of the toasting device. The wires 13 forming the gratings are suitably attached together as at 14 and may be supported in the device in any suitable manner. A pair of heating elements 15 are provided at each side of the gratings. These heating elements illustrated are in the form of radiant heaters 16 to which gas is supplied by means of conduits 17 and 18. In the conduit 18 there is placed a control valve 19 which is thermostatically operated by a suitable rod 20 extending into the oven 21 which is formed by the inclosing walls of fire brick or any other suitable material, 22 and 23 for housing the heat in the oven and suitably controlling the same. In order that the outer casing will not be heated to a high degree this casing is spaced from walls 22 and 23 of the earthenware oven to provide air spaces 25 thru which the air may circulate for cooling purposes which air insulation prevents the casing 24 from being raised to a degree of heat higher than is desired. Suitable supporting legs 26 are provided on the casing for raising the same above a table or other support for the purposes as hereinafter will appear.

The apparatus illustrated is designed to receive three rows of vertically arranged slices of bread resting on each other end to end between the guide bars. A bottom wall 27 supports the slices of bread 28 while the same are being toasted in the machine. This bottom wall is movable so as to permit the bread to fall by gravity into the wire chute 29 and be conveyed to the end 30 of the chute. A cover 31 is also provided at the top of the space 12 to act as a signal and to retain the heat in the oven, the cover 31 and bottom 27 acting in unison, as presently described.

The bottom wall 27 is removably secured to a rotatably mounted rod 32 carrying a plate 33 to which there is connected a link 34 which is also attached to an arm 35 pivoted as at 36 to the casing and which carries as at 37 the cover 31. In Figure 5, the bottom 27 is shown in open position to permit the bread previously toasted to be discharged and in order to close this bottom a handle 38 is moved in the direction of the arrow which swings the plate on its pivot 32 through the arms 39 and 40, the latter having a notch 41 which engages a pin 42 attached to the plate 33 and moves the bottom 27 to its closed position, as illustrated in Figure 4 at the same time the cover or lid 31 is moved to open position which signals or indicates to the operator that the space 12 is free to receive bread to be toasted.

A timing mechanism is provided for opening the bottom 27 to permit discharge of the bread and this timing mechanism is set by a movement of the handle 38 in the direction opposite to that of the arrow A by which the arm 39 engages the offset end 43 of the lever 44 and raises the lever to the position illustrated in Figure 4, the lever being held against action of its weight 45 by a ratchet arm 46 which engages the pinion 47.

This pinion 47 is provided with a ratchet let-off of the type which is common in watches or the like (not shown) and which permits the pinion 47 to move step-by-step slowly to the end of the teeth 48 of the arm 46, after which the arm is free to drop under action of the weight 45 and through the lever 44 and offset removes the arm 39 to cause the pin 49 to engage the notch 50 and throw the lever 51 upwardly to close the cover 31 and through link 34 to open the bottom and permit the bread to discharge.

The timing of the device may be accomplished by varying the amount to which the weight 45 is raised to cause a varying number of the teeth 48 of the arm 46 to engage the pinion. This raising is controlled by the position of the cam 52 in various positions about its center 53 to permit the lever 44 to be raised to various extents. In the event that after the machine is set one desires the bread toasted a lesser amount than that to which the timing mechanism of the machine has been adjusted an auxiliary let-off is provided in the form of a lever 54 pivoted as at 55 and operable through a connecting rod 56 to withdraw the arm 46 sufficiently from engagement with pinion 47 as to permit it to drop under action of the weight. A suitable handle 57 may be provided for ready operation of this rod 56.

In order that the ejection of the toast may be positive in case of the bread sticking to the gratings 10 or 11, ejector arms 58 and 59 are mounted on rotatably mounted rods 60 and 61, which rods act in unison by means of a link and crank connection 62 and 63 and are operated simultaneously with the opening of the bottom by means of connecting rod 64 and crank 65 to throw the arms 58 and 59 downwardly to positively eject the bread from the toaster. It will be understood that the mechanism shown in Figure 6 is at the opposite end of the machine from the end illustrated in Figure 4.

It is found that slices of bread are invariably drier at their outer edges than in the center which would ordinarily cause these edges to become scorched or toasted beyond the degree desired for the remainder of the slice and in order to control this toasting to a better degree a partition or wall 66 is provided to overhang the edges of the bread slightly and to protect them from the full action of the heat of the oven. These edges are serrated as at 67 to provide a saw toothed edge which prevents any even line marking on the bread and permits the heat to pass through the serrated edge slightly. At the top of the oven there being more heat than at the lower portion these partitions are carried inwardly to also protect the top edges of the bread and corners as illustrated at 68 and it is understood that these partitions may be positioned at any desired place in the oven to properly control the action of the heat on the bread.

These partitions absorb a large portion of the heat which is directed towards the bread and in order to carry off this heat to a certain extent draft chimneys or conduits 69 are provided for conducting the air from the bottom to the top of the machine to maintain these partitions substantially cooler than the temperature of the air in the oven. The conduits are positioned to separate the vertical rows of bread as will be apparent from Figure 2.

There are openings or holes 70 in the bottom 27 to permit the air to pass therethrough into these chimneys 69 and also a cooperating opening 71 in the cover to permit passage of air therethrough when the cover is in its closed position.

It will be understood that the cover is closed to prevent entry of bread when the bottom is open and to also retain the heat in the oven when the same is not in use to cause the thermostat to diminish the supply of gas and thus operate the machine on the greatest economy.

From the foregoing it will be seen that the invention provides a toasting apparatus which accomplishes many desired results in a simple and satisfactory manner.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a bread toaster, heating elements, and serrated edged partitions positioned to protect the edges of the bread from the full action of the heat from said elements.

2. In a bread toaster, heating elements, partitions positioned to reduce the action of the heat from said elements upon the edge portions of the bread, and means for cooling the partition.

3. In a bread toaster, heating elements, partitions positioned to interrupt the action of said heat from said elements upon the edge portions of the bread, and a conduit for air along said partition to cool the same.

4. In a bread toaster, heating means, walls of an earthen substance about the same and a casing spaced from said earthen walls forming an air space between the same whereby to protect the casing from the heat of said elements.

5. In a bread toaster, heating means, walls of fire brick about the same, and a metal casing spaced from said fire brick forming an air space between the same and protecting said metal from excessive heat.

6. In a bread toaster, a pair of heating elements vertically arranged spaced guides fixed relative to and positioned between said elements to receive a slice of bread, a bottom member upon which said bread is supported while toasting, said bottom being movable downwardly away from and relative to said guides to permit said bread to be discharged after toasting.

7. In a bread toaster, a pair of heating elements, vertically-arranged spaced guides fixed relative to and positioned between said elements to receive a slice of bread, a bottom member pivoted at its opposite ends upon which said bread is supported while toasting, a manually operable handle, and means responsive to the movement of said handle for operating said bottom to permit the bread to discharge by gravity.

8. In a bread toaster, a pair of heating elements, vertically-arranged spaced guides fixed relative to and positioned between said elements to receive a slice of bread, a bottom member upon which said bread is supported while toasting, a manually operable handle for operating said bottom member, a timing mechanism for operating said bottom, and means responsive to the manipulation of said handle for setting said timing mechanism.

9. In a bread toaster, a pair of heating elements, vertically-arranged spaced guides fixed relative to and positioned between said elements to receive a slice of bread, a cover having openings therethrough and hinged for partially closing the entering space between said guides, and means for moving said cover on said hinge from closing position.

10. In a bread toaster, a pair of heating elements, vertically-arranged spaced guides between said elements to receive a slice of bread, a cover for closing the entering space between said guides, a bottom member upon which the bread is supported while toasting, and means for operating said cover and bottom simultaneously.

11. In a bread toaster, a pair of heating elements, vertically-arranged spaced guides between said elements to receive a slice of bread, a cover for closing the entering space between said guides, a bottom upon which the bread is supported while toasting, a timing device, a handle, and means operated by said handle to close said bottom, open said cover and set said timing device to permit the bottom to open after a predetermined period of time.

12. In a bread toaster, a pair of heating elements, vertically arranged spaced gratings between said elements formed of wire, the wire of one grating having a dimension greater in the direction towards the other grating than in a direction at right angles thereto to assist in controlling the space between said gratings.

In testimony whereof I affix my signature.

HARRY S. MORRISON.